(12) United States Patent
Leitert et al.

(10) Patent No.: US 9,015,004 B2
(45) Date of Patent: Apr. 21, 2015

(54) SYSTEM FOR EMERGENCY POWER SUPPLY IN CASE OF POWER GRID FAILURE

(75) Inventors: Thomas Leitert, Berlin (DE); Ingo Schwenzien, Berlin (DE)

(73) Assignee: Timekontor AG, Berlin (DE)

( * ) Notice: Subject to any disclaimer, the term of this patent is extended or adjusted under 35 U.S.C. 154(b) by 1097 days.

(21) Appl. No.: 12/995,228

(22) PCT Filed: Jun. 2, 2009

(86) PCT No.: PCT/DE2009/000760
§ 371 (c)(1),
(2), (4) Date: Feb. 15, 2011

(87) PCT Pub. No.: WO2009/143834
PCT Pub. Date: Dec. 3, 2009

(65) Prior Publication Data
US 2011/0137485 A1 Jun. 9, 2011

(30) Foreign Application Priority Data

May 30, 2008 (DE) .......................... 10 2008 026 575
Jan. 7, 2009 (DE) .......................... 10 2009 004 273

(51) Int. Cl.
G06F 19/00 (2011.01)
H02J 9/08 (2006.01)

(52) U.S. Cl.
CPC ........................................ H02J 9/08 (2013.01)

(58) Field of Classification Search
CPC ..... H02J 2009/068; H02J 7/0013; H02J 7/34; H02J 9/06
USPC .................................. 702/183, 182, 185, 188
See application file for complete search history.

(56) References Cited

U.S. PATENT DOCUMENTS

| | | |
|---|---|---|
| 2002/0024332 A1 | 2/2002 | Gardner |
| 2005/0007071 A1* | 1/2005 | Colberg et al. ............... 320/119 |
| 2005/0278075 A1 | 12/2005 | Rasmussen et al. |
| 2008/0058997 A1 | 3/2008 | Timblin |

FOREIGN PATENT DOCUMENTS

| | | |
|---|---|---|
| EP | 1819033 | 8/2007 |
| WO | 2006/132070 | 12/2006 |

\* cited by examiner

*Primary Examiner* — Edward Raymond
(74) *Attorney, Agent, or Firm* — Karin L. Williams; Mayer & Williams PC

(57) ABSTRACT

A system for emergency power supply in case of power grid failure, particularly for longer-term power failures, is described. The system is based on emergency power systems that automatically form an autonomous telecommunication network and transmit data by means of the telecommunication network about the operating state of the emergency power supply system and optionally further data.

16 Claims, No Drawings

SYSTEM FOR EMERGENCY POWER SUPPLY IN CASE OF POWER GRID FAILURE

The invention relates to a system for emergency power supply in case of power grid failure, particularly for longer-term power failures. The system is based on emergency power systems that automatically form an autonomous telecommunication network and transmit data by means of said network about the operating state of the emergency power supply system and optionally further data.

BACKGROUND

Today, nearly all critical infrastructures depend on a reliable energy supply, particularly power supply. In case of power failures, these infrastructures and facilities such as water and gas supply, control centers, hospitals, telecommunication devices or computer centers are further operational by an emergency power supply only. For longer-term power failures, the functionality of the emergency power supply depends on the battery capacity, the performance of the fuel supply or the respective fuel reserve. Usually, the capacities or tank reserves are sufficient for an operation between three hours (for instance base stations of mobile networks) up to maximum 24 hours in hospitals. Only a few computer centers have reserves for 72 hours operation. For maintaining the emergency power supply, therefore, in case of longer-term power failure the replenishment of fuel is essential. Mobile emergency power systems, which can be provided in large numbers for instance by the Technische Hilfswerk (THW, the German Federal Agency for Technical Relief), depend on a functioning fuel supply. Moreover, today very few organizations have their own safe fuel supply. Even the police, the fire department and the THW are dependent on the fuel supply by public fueling stations. In the case of large-area power failures, even fueling stations are not at disposal anymore for fuel supply, since usually they do not have any emergency power supply. Thus, the fuel cannot be pumped from the tanks into vehicles or emergency power systems. Further, there is no possibility at present to simply connect emergency power systems to the fueling stations and to operate them thereby, since fueling stations are not so equipped.

For the delivery of fuel to emergency power systems and fueling stations, the fuel must be available in fuel depots and it must be possible to deliver it. For this purpose, it must be possible that the carriers are informed about the need and that the operation of their vehicles is coordinated. For filling fuel into the tanker trucks, functioning fuel depots are required. The situation gets worse by that in the case of a large-area power failure, all emergency power systems will start at the same time and then have to be refueled also at approximately the same time. This leads to an aggravation of the situation and places enormous demands on the logistics concept. Corresponding necessities result in an analogous manner for other forms of energy, too, as for instance compressed gases (propane, butane, hydrogen), liquid hydrogen, electrical energy storage devices (accumulators), but also cooling energy storage devices (for instance nitrogen, helium, hydrogen in liquid form).

Object of the Invention

It is therefore the object of the invention to provide a system for emergency power supply in case of power grid failure, which is capable of securing a fuel supply for the emergency power systems as well as for the vehicles of the action forces and rescue teams as long as possible, in order to prevent the complete failure of these systems.

Achievement of the Object

This object is achieved by the system according to the invention for emergency power supply, including at least two emergency power systems, with at least one fuel or energy reserve each and at least one telecommunication center each, wherein the emergency power systems have the following features:

a) at least one sensor, which detects the quantity of the fuel or energy reserve,
b) optionally a computing unit, which determines the fuel or energy consumption per unit of time and/or the remaining life of the emergency power system from the change of the fuel or energy reserve,
c) at least one telecommunication unit, which after the start of the emergency power system is automatically connected with other emergency power systems and transmits at least the quantity of the fuel or energy reserves of the emergency power system and/or the fuel or energy consumption per unit of time and/or the remaining life of the emergency power system, further characterized in that the telecommunication center receives and evaluates at least the transmitted data about the fuel or energy reserves of the emergency power systems.

The system for emergency power supply according to the invention preferably comprises at least 5 emergency power systems according to the invention, particularly preferably at least 10 emergency power systems according to the invention.

DESCRIPTION OF THE INVENTION AND PREFERRED EMBODIMENTS

The system according to the invention is based on a fuel- (e.g. diesel-) operated emergency power system. This emergency power system is capable to secure the power supply of a unit to be supplied (for instance a hospital or a fueling station). The power generated therefor may for instance have low voltages of 110, 220, 250 or 380 V or also medium voltages from 3 kV to 30 kV. The power rating of the emergency power system may be in the range of a few kVA (kilo-volt-amperes (formerly: kilo-watts)) for smaller units, and it will preferably be in the range of several hundred kVA for larger units to be supplied. Such systems are well known and commercially available. The emergency power system according to the invention comprises at least one sensor, which detects the quantity of the fuel reserve and/or the fuel consumption per unit of time, and further at least one computing unit, which determines the remaining life from the change of the fuel reserve or from the fuel consumption per unit of time. Such systems are for instance known from the automobile sector and do not need any further explanation. In an alternative embodiment, the computing unit is integrated in the telecommunication center and determines there the remaining life of the emergency power system from the transmitted data about the quantity of the fuel reserve and/or about the fuel consumption per unit of time. The term "fuel" also comprises the other forms of energy described above, such as for instance compressed gases, liquid hydrogen, stored electrical energy, cooling energy.

Further, the emergency power system comprises a telecommunication unit. The telecommunication unit automatically starts after the start of the emergency power system and can transmit at least the sensor data about the fuel or energy quantity and/or the remaining life of the emergency power system.

For this purpose, the telecommunication unit can make use of existing telecommunication networks (as e.g. ISDN, W-LAN, GSM, mobile telephony, POTS, Tetra, satellite links).

In a preferred embodiment of the invention, two or more emergency power systems according to the invention form an autonomous telecommunication network, which operates independently from existing telecommunication infrastructure and/or already existing networks. This mode of operation particularly permits the autonomous telecommunication in the case of a long-term large-area power failure, since in such a situation the ability of operating of existing telecommunication networks is not secured.

Such systems for forming autonomous telecommunication networks are known from various sectors and do not need any further explanation.

In another preferred embodiment of the invention, the telecommunication unit comprises another power supply (e.g., battery, accumulator, solar panel, fuel cell), so that in case of a failure of the emergency power system (for instance because of lacking fuel replenishment or because of a fault) the transmission of the corresponding data (for instance location and operating state/error message) is further secured. Such systems for securing an interruption-free power supply are in principle known in the art and do not need here any further explanation.

In an embodiment of the invention, the emergency power system according to the invention is connected to a power grid. This connection secures that the electrical energy necessary for the start of the emergency power supply is available, for instance by a continuously charged accumulator. Alternatively, the emergency power system can also be started by compressed air. In case of a failure of the power grid, the emergency generator is started. The latter then secures the further operation of the telecommunication unit. The telecommunication unit can be started after the start of the generator. Alternatively, it is also possible that first the telecommunication unit starts making use of an accumulator, and then the generator is started. The further power supply described in the previous section (for example battery, accumulator, solar panel, fuel cell) has the effect that in case of a failure of the power generator, the telecommunication unit can be further operated at least for a certain time. Depending on the current consumption, the telecommunication unit can be further operated at least for several hours, preferably several days, so that at least the failure of the emergency power system can be transmitted. In another embodiment of the invention, further data can also be transmitted, even when the generator itself should fail. Preferably, at least the data about the location (e.g., GPS) and the type of the failure are transmitted.

The emergency power system according to the invention can of course also be so designed that it can make use alternatively either of an existing telecommunication network or of an autonomous telecommunication network formed by several emergency power systems.

The emergency power system according to the invention can further also be so configured that it reports continuously or at certain times status information (e.g., operating state, fuel reserve, remaining lives, error messages, maintenance intervals, location) by an existing telecommunication network or by an autonomous telecommunication network formed by several emergency power systems.

The telecommunication devices required for the use according to the invention are in principle known in the art and are described in the specialist literature. Also known are the respective interfaces and communication protocols permitting a faultless data communication (even in case of a failure of one or several telecommunication devices). Therefore, telecommunication devices, interfaces and data protocols do not need to be explained here in more detail.

In another embodiment of the invention, the emergency power system or the telecommunication center additionally comprises a unit for controlling the maintenance intervals. When the end of an interval approaches, information is automatically transmitted to the telecommunication center or is displayed there, in order to perform the maintenance.

In another embodiment of the invention, the emergency power system additionally comprises a unit for controlling the operating state (e.g., on/off, full power, partial power, fault) and transmits these data by means of the telecommunication unit to the telecommunication center.

In another embodiment of the invention, the emergency power system additionally comprises a unit for controlling the condition of the power supply by the public network (e.g., voltage, frequency) and transmits these data by means of the telecommunication unit to the telecommunication center.

In another embodiment of the invention, the emergency power system comprises one or more fault sensors, which detect faults of the system during operation and transmit them by means of the telecommunication unit to the telecommunication center. By means of this information, it is possible to make repairs in dependence from the fault, the position of the emergency power system and the importance of the emergency power supply at the respective point of supply.

Furthermore, at least one telecommunication center is required for the system according to the invention, which receives and evaluates the transmitted data, particularly the remaining lives of the emergency power systems. In the telecommunication center according to the invention, the data of the individual emergency power systems are received and prioritized if necessary. From the center, for instance the logistics of the fuel replenishment can be organized. For this purpose, in a first embodiment, the remaining lives and positions of the emergency power systems can be determined, so that tanker trucks can supply the emergency power systems in the order of the remaining lives (first the systems with shortest remaining life, others later), considering the respective distances. For this, it is necessary that the position of the respective emergency power systems is known. This takes place in the simplest case by storing the respective position of the system in the telecommunication center when setting up the respective system. In case of mobile emergency power systems, the position has to be updated every time when moving to a new location.

The telecommunication center can also be designed in a mobile manner, for instance in or as part of a motor vehicle. For instance, a tanker truck could also include a telecommunication center, so that the fuel distribution can be planned while the tanker truck is mobile. Of course, the system according to the invention can also comprise several telecommunication centers. For instance, different centers can be provided for different jobs (for instance replenishment and maintenance/repair) or different regions. Further, a combination of stationary and mobile telecommunication centers is also possible.

In another embodiment of the invention, the emergency power system comprises a GPS unit (global positioning system), which automatically transmits the respective location to the telecommunication center. In this way, the exact location is stored in the center. Such GPS units are known in the art and commercially available. In another embodiment of the invention, the prioritization of the fuel replenishment is also (or exclusively) made under consideration of the facility to be supplied, so that for instance hospitals are supplied faster than administrative institutions.

An essential aspect of the invention is the emergency power supply of fuel stations or fuel depots, since in the case of a long-term power failure, indirectly, the fuel supply of the infrastructure, particularly of the emergency power systems, is also endangered. In an embodiment of the invention, at least one fueling station or one fuel depot is supplied by means of an emergency power system, so that in the case of the failure of the power grid the further supply with fuel is secured. In a particular embodiment of the invention, this is a mobile emergency power system, which in the case of the power failure can be connected by respective interfaces with the fueling station.

Another aspect of the invention is the use of the telecommunication system of the emergency power systems according to the invention for the transmission of further data. For this purpose, the emergency power systems can be connected by respective interfaces for instance to computers of the hospitals, the police, the THW, the fire department or other organizations to be supplied and the data of the different units can be transmitted. The term data transmission includes the transmission of files (for instance binary files), but also the transmission of voice and/or pictures. For a large-area power failure and large-area emergency power supply resulting therefrom by means of the system according to the invention, a high-performance infrastructure for the transmission of the most important data and thus the preservation of public order is obtained by forming an autonomous telecommunication network. A particular aspect herein is the encryption of the transmitted data by known methods. The principle of the data transmission by telecommunication networks with or without data encryption is per se known in the art, described elsewhere and thus does not need any further explanation here.

Power failures are particularly critical for hospitals, since they need power for the operation of medical and life-sustaining equipment. But also other safety-relevant systems (such as radar systems for air traffic control, traffic lights or railway signaling equipment) or other providers (such as water works, gas works or telecommunication providers) need power for their work. For this reason, for instance hospitals and other critical facilities as well as many businesses, have an emergency power supply, which is often operated by diesel generators and automatically turn on, when a power failure occurs.

Besides the emergency power supply, the fuel supply for vehicles of action forces (fire department, police, THW, governmental agencies) and other important service providers (such as emergency doctors, food supply, public transportation etc.) represent another important aspect for the preservation of public order and the supply of the population. Similar as for the emergency power supply, action forces are usually not capable themselves to secure the fuel supply of their vehicles. For instance, the Berlin fire department has no own fueling stations, and also the THW must rely for the operation of vehicles, power generation and pumps on the fuel supply by "normal" fueling stations. The fueling stations and fuel depots thus represent an important condition for the preservation of many other critical infrastructures. In case of a power failure, fueling stations themselves are, however, also concerned, and not capable anymore to supply fuel from their tanks The system according to the invention described above solves these problems.

One embodiment of the invention with the formation of an autonomous telecommunication network additionally allows the setting-up and operation of a power and telecommunication supply in areas with poor infrastructure, for instance in the case of a larger supply failure, in areas of crisis and war or also in areas, where no functioning networks exist. For instance, in an area with poor infrastructure, a number of emergency power systems according to various aspects of the inventions can be installed, which, after set into operation, will form a telecommunication network. The latter can also transmit, besides the operational data of the emergency power supply system, further data (see below). In particular embodiments, the airdrop of emergency power systems according to the invention from airplanes (e.g., per parachute) is also possible. In this embodiment, the emergency power system can, for instance, automatically be started after landing. In another embodiment of the invention, after the airdrop or the installation of the emergency power system, only the telecommunication unit is activated, which combines with other units to form an autonomous telecommunication network. By this autonomous telecommunication network, the emergency power system can be started if needed. In another specialization of this aspect of the invention, the emergency power system can also be supplemented or replaced by solar panels, fuel cells, piezo elements or other alternative energy sources. In this embodiment, a telecommunication infrastructure can be made available in a simple way in larger areas.

EXAMPLES

Example 1

A hospital is equipped with an emergency power system according to the invention. In case of a failure of the power grid, the emergency generator is automatically activated. Simultaneously, the telecommunication unit is activated. The latter automatically connects with a telecommunication center and transmits at least the quantity of residual fuel. In the telecommunication center, the signal of the emergency power system is registered, and from the quantity of residual fuel the presumable service life is determined. In the telecommunication center, then the replenishment for the emergency power system is organized.

Example 2a

In a region, a series of service providers (fire departments, hospitals, police departments) are equipped with emergency power systems according to the invention. After a large-area power failure, the respective emergency power system starts in each of the facilities.

Simultaneously, the telecommunication units are started. The respective telecommunication units automatically connect to an autonomous telecommunication network, which operates independently from existing telecommunication networks. The respective emergency power systems transmit at least the respective fuel quantity to a telecommunication center, which establishes the supply plan based on the obtained data.

Example 2b

In a modification of Example 2a, the emergency power systems according to the invention further comprise interfaces for the data transmission. After the start of the emergency power systems, additional data can be transmitted (for instance service times of police and fire department) by the telecommunication devices and the autonomous telecommunication network formed thereby.

Example 3

After a large-area power failure, several emergency power systems according to the invention are installed in the area, where the power failure occurs. After installation, the systems are manually started. Simultaneously, the telecommunication devices are started, which form an autonomous telecommunication network. The emergency power systems are provided with a GPS system. The emergency power systems also transmit, besides the fuel residual quantity, the GPS data, so that in the telecommunication center there is always kept track of a location and the remaining life of the emergency power systems. From the telecommunication center then the energy replenishment for the emergency power systems can be organized.

Example 4a

In an area, which comprises neither power nor telecommunication infrastructure (e.g. jungle areas or urban areas, e.g. after EMP or large-area power failure after a geomagnetic storm), mobile emergency power systems are installed or dropped with parachutes from airplanes. After installation or landing, the emergency power systems automatically start. Simultaneously, the telecommunication devices are started. The emergency power systems are capable of securing for some time the power supply at the respective points. Simultaneously, an autonomous telecommunication network is formed, which secures the telecommunication supply in the region. Because of the multitude of installed emergency power systems, telecommunication can also be secured over a longer distance. By simultaneously transmitted GPS data, the telecommunication center always has a complete picture of the individual systems with regard to the locations and the respective remaining lives.

Example 4b

In an alternative embodiment, the emergency power systems are configured such that they include solar cells and an accumulator as a buffer for night times. In this way, the telecommunication transmission can be secured for longer times. In this embodiment, the supply with emergency power is of secondary importance only, primary importance has the telecommunication supply of the area.

The invention claimed is:

1. A system for emergency power supply, comprising at least two emergency power systems each with at least one fuel or energy reserve, and at least one telecommunication center, wherein each of the at least two emergency power systems comprise:
   a) at least one sensor, which detects the quantity of the fuel or energy reserve,
   b) optionally a computing unit, which determines the fuel or energy consumption per unit of time and/or the remaining life of the emergency power system from the change of the fuel or energy reserve, and
   c) at least one telecommunication unit, which after the start of the emergency power system is automatically connected with other emergency power systems and transmits at least the quantity of the fuel or energy reserves of the emergency power system and/or the fuel or energy consumption per unit of time and/or the remaining life of the emergency power system to the telecommunication center, and,
   further characterized in that the telecommunication center receives and evaluates at least the transmitted data about the fuel or energy reserves of the emergency power systems.

2. The system for emergency power supply according to claim 1, wherein the telecommunication units of at least two emergency power systems automatically form an autonomous telecommunication network.

3. The system for emergency power supply according to claim 1, wherein at least one emergency power system additionally comprises a unit for controlling the maintenance intervals and/or for controlling the operating state and/or the network supply.

4. The system for emergency power supply according to claim 1, wherein the emergency power systems are mobile or stationary.

5. The system for emergency power supply according to claim 1, wherein at least one emergency power system allows a remote start.

6. The system for emergency power supply according to claim 1, wherein at least one emergency power system comprises one or more fault sensors.

7. The system for emergency power supply according to claim 1, wherein at least one emergency power system is configured to supply power to a fueling station and/or a fuel depot.

8. The system for emergency power supply according to claim 1, wherein at least one emergency power system additionally comprises at least one interface for the transmission of further data.

9. The use of a system for emergency power supply according to claim 8 for the transmission of data.

10. The system for emergency power supply according to claim 1, wherein the telecommunication center is stationary or mobile.

11. The system for emergency power supply according to claim 1, comprising five emergency power systems.

12. A system for emergency power supply, comprising at least two emergency power systems each with at least one fuel or energy reserve, and at least one telecommunication center, wherein each of the at least two emergency power systems comprise:
   a) at least one sensor, which detects the quantity of the fuel or energy reserve,
   b) optionally a computing unit, which determines the fuel or energy consumption per unit of time and/or the remaining life of the emergency power system from the change of the fuel or energy reserve, and
   c) at least one telecommunication unit, which after the start of the emergency power system is automatically connected with other emergency power systems and transmits at least the quantity of the fuel or energy reserves of the emergency power system and/or the fuel or energy consumption per unit of time and/or the remaining life of the emergency power system to the telecommunication center, and,
   further characterized in that the telecommunication center receives and evaluates at least the transmitted data about the fuel or energy reserves of the emergency power systems,
   wherein at least one emergency power system additionally comprises a GPS unit for detecting the location.

13. An emergency power system comprising
a) at least one sensor, which detects the quantity of the fuel or energy reserve, and
b) at least one telecommunication unit, which after the start of the emergency power system is automatically connected with other emergency power systems and transmits at least the quantity of the fuel or energy reserves of the emergency power system to a telecommunication center.

14. The emergency power system according to claim 13, further comprising at least one the following additional components:
   at least one computing unit, which determines the fuel consumption per unit of time and/or the remaining life from the change of the fuel or energy reserve,
   at least one GPS unit,
   at least one unit for controlling the maintenance intervals,
   at least one remote start unit,
   at least one fault sensor, and
   at least one interface for the transmission of further data.

15. The emergency power system according to claim 14, wherein said system is mobile or stationary.

16. The emergency power system according to claim 13, wherein said system is mobile or stationary.

* * * * *